United States Patent [19]

Morelle et al.

[11] Patent Number: 4,979,902
[45] Date of Patent: Dec. 25, 1990

[54] DYSLEXIA READING DEVICE

[76] Inventors: Alix Morelle, 215 McDaniel St.-812, Dayton, Ohio 45405; Fredric T. Morelle, 2636 Troy Rd., Schenectady, N.Y. 12309

[21] Appl. No.: 402,909

[22] Filed: Sep. 6, 1989

[51] Int. Cl.$^5$ ............................................. G09B 19/00
[52] U.S. Cl. ...................................... 434/184; 351/246
[58] Field of Search ................... 434/184, 178; 351/46, 351/246, 168

[56] References Cited

U.S. PATENT DOCUMENTS

| | | | |
|---|---|---|---|
| 838,840 | 12/1906 | Campman | 434/178 |
| 839,016 | 12/1906 | MacDonald | 351/46 X |
| 1,607,544 | 8/1926 | McCready | 434/178 X |
| 1,876,769 | 1/1931 | Sheffield | 351/46 X |
| 3,555,563 | 1/1971 | Grossman | 351/46 X |
| 3,842,822 | 10/1974 | Levinson | 128/2 R |
| 3,843,240 | 10/1974 | Cornsweet | 351/246 X |
| 3,906,644 | 9/1975 | Levinson | 35/35 R |
| 3,967,885 | 7/1976 | Byler | 351/46 |
| 4,292,030 | 9/1981 | Lobdell et al. | 434/178 X |
| 4,379,699 | 4/1983 | Nelson | 434/184 |
| 4,498,743 | 2/1985 | Feinbloom | 351/46 X |
| 4,698,564 | 10/1987 | Slavin | 351/246 X |
| 4,770,635 | 9/1988 | Gabay | 434/184 X |

Primary Examiner—Richard J. Apley
Assistant Examiner—Rachel M. Healey
Attorney, Agent, or Firm—Schmeiser, Morelle & Watts

[57] ABSTRACT

Method and apparatus for restricting field of vision so as to provide a dyslexic reader physical means for narrowing field-of-sight concentration in order to prevent eye wander and aid in normal compensatory sight narrowing by the reader. The method comprises an obfuscation of the peripheral field of vision while concurrently focusing or providing clear viewing means in the centralized, enhanced narrow reading field. The aforesaid method is readily accomplished by use of either the pin-hole camera, consisting of a minute aperture in an eye-enveloping, obfuscating field or, more practically, a set of spectacles consisting essentially of opacified or defocusing lenses having with them a centralized clear field-of-vision lens, window or aperture which effectively accomplishes in both eyes of the dyslexic reader what the pin-hole aperture does for a single eye.

3 Claims, 1 Drawing Sheet

FIG. 1
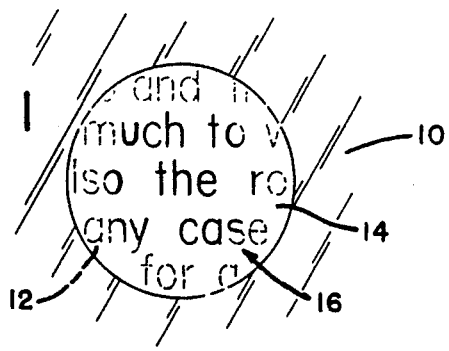
FIG. 2
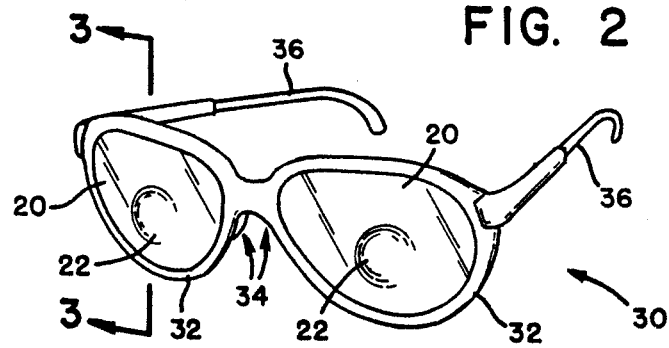
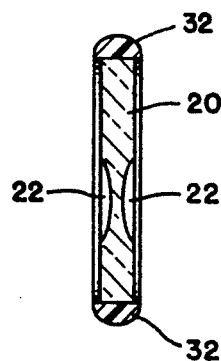
FIG. 3

DYSLEXIA READING DEVICE

BACKGROUND OF THE INVENTION

1. Field of the Invention

This invention relates generally to eyewear to be used as a reading aid for dyslexia patients, and particularly to apparatus for fulfilling everyday reading requirements of persons afflicted with this perceptual problem.

2. Description of the Background Art

A great deal of conjecture exists regarding the causes of dyslexia, primarily as observed in young adults and school-age children. Older views, which relate the cause of primary dyslexia to a dysfunction of the cortex, have not been adequately borne out in either statistical studies nor postmortem studies. A foremost authority in the country, Harold Levinson, M.D. of Greatneck, N.Y., points out in two significant patents issued to him and his colleagues, U.S. Pat. No. 3,842,822 and U.S. Pat. No. 3,906,644, that significant medical discoveries underlying their inventions indicate there exists in dysmetric dyslexic children, a sub-clinical nystagmus, or eye vibration. The vibration is at an almost imperceptible frequency or number of beats per second, as demonstrated by electronystagmographic recordings taken when the eyes were closed, to eliminate fixation. It is the Levinson proposition that children suffering from the condition indicated are unable to properly fix vision because of the rhythmic, uncontrollable eye movement. It is further noted that the eye movement is sub-clinical in nature, in that measurement of it requires an electronystagmographic frequency recording under favorable conditions. In Levinson '822, a reading or symbol-recognition test, capable of being administered to a large examination group of children, produced blurred vision only in those of the group who possibly suffer dysmetric dyslexia. The test induces an eye oscillation of a selected extent which is normally below the level that produces blurred vision in those not affected with dysmetric dyslexia. It is used as an effective diagnostic screening procedure, even for pre-school children with cerebellar-vestibular dysfunctions, and who have not as yet had the opportunity to exhibit poor or refractory response to reading instruction. What is hypothesized by Levinson in '822 is that by inducing an eye oscillation of a selected extent and which is normally below the threshold level producing blurred vision in a normal person, in additive relation to a sub-clinical eye oscillation produces an additive effect and exceeds the threshold level, automatically identifying those who experienced a blurred vision as possibly disposed to dysmetric dyslexia. Thus, in this particular apparatus, Levinson creates an environment which exceeds the compensatory ability of the dyslexic patient and thus identifies those possibly having the syndrome. It can be seen that the producing of blurred vision is non-therapeutic in nature, being merely diagnostic.

Levinson '644, relying on that inventor-author's previously held hypothesis, regarding dysmetric dyslexia, teaches a method which calls for the presentation of reading material in letter or word-size units, one at a time and in reading sequence at a fixed location, so that the child reading is not required to sequentially scan the reading material. The inventor points out that the material is presented in temporal rather than spatial sequence or relation. Thus, there is exhibited only slight or minimal eye vibration which results in minimal ocular overshooting and undershooting and avoids blurring and scrambling, the most common symptoms of the dyslexia affliction. Levinson further teaches that the technique of '644 makes use of a heretofore unknown compensatory mechanism existing in dysmetric dyslexic children, namely a functional narrowing of the visual field so as to avoid blurring. The instant inventors point out at this time that what Levinson observed in his last series of experiments, leading to '644, is the very phenomenon which they have sought to capitalize upon with the instant invention. The significant difference is, however, that the instant invention purposefully narrows the visual field so as to aid the dyslexic patient in making the aforementioned compensation and thus, ameliorates eye oscillation.

In 1983, Nelson was issued U.S. Pat. No. 4,379,699, a significant number of years after Levinson patented his method of presenting reading material to dysmetric dyslexic-identified children. Nelson teaches a method and apparatus for improving the reading efficiency of persons with specific dyslexia. Unlike Levinson, Nelson does not go into the specific categorization of dyslexia types, but rather appears to be dealing with what he terms "specific dyslexia" and what appears to be similar to the malady described by Levinson as dysmetric dyslexia. Irrespective of the nomenclature employed, the method and apparatus of Nelson appears therapeutic in that the objective is to provide a means whereby the dyslexic patient might improve reading efficiency, the most notable deficiency of these dyslexia-afflicted persons. The Nelson method of effecting an improvement in reading efficiency includes providing to the dyslexic student reading material wherein the matter has a brightness substantially greater than that of the background on which the reading matter is provided. Here, unlike the Levinson apparatus, substantial change is made to the quality or at least the physical attributes and characteristics of the material being read. Like the Levinson devices, however, the Nelson device also requires some form of preconditioning performed on the reading material and thus, is extremely limited for usage by those dyslexic patients who, in spite of their malady, are quite capable readers and would perhaps be expert were it not for the fact that there is very little way, short of drug therapy, for them to control the oscillatory eye movements that are the hallmark of the dyslexia affliction.

One of the instant inventors was first diagnosed as dysmetric dyslexic at age 26 by Harold Levinson, M.D., the patentee of Levinson '822 and '644. Throughout childhood, and to young adulthood, she had overcome a great number of difficulties and acquired consummate reading skill. Nevertheless, the dyslexia dysfunction was never more pronounced or severe as when she entered the university and attempted courses such as the calculus which utilized atypical symbology. After diagnosis by Levinson, and initiation of a mild drug therapy, greater concentration was achieved and was a considerable help in reading through the vast amounts of scientific material. Some diminishment of the reading problem was noted but, most notable was the ability to maintain balance that could be attributed to nothing other than the effect of anti-vertigo medications. Then, quite serendipitously, she acquired bifocals, where she had formerly used a set of reading glasses of mild prescription and alternately distance glasses of a very strong prescription. When first reading ordinary materials with the new bifocals, the dyslexic inventor found that she was reading with a true narrowness of vision in that she was able to observe clearly only a few alphanumeric characters at a time, all remaining characters in the line, both before and after the target phonetics, being blurred by the peripheral far-vision correction. It was at this point also that she began to truly appreciate the Levinson observation of oscillatory eye movement. The instant inventors are thoroughly convinced that this is indeed the problem faced by dyslexic patients. It is relegated to eye oscillations of a horizontal nature and not in much, if any, respect above or below the line being read. When this and similar reading phenomena were explained to the second inventor of the instant invention, they decided to construct a device that would comprise a non-drug, but therapeutic, protocol to aid the dyslexia victim. After a careful and diligent examination of the prior art, the instant inventors decided that, helpful though they may be, the actual apparatus of Levinson and Nelson could not be configured so as to aid any and all dyslexics in any reading situation.

It is therefore a primary object of this invention to provide a dyslexic reader with a simple apparatus that may be used in any reading situation and would aid the reader in acquiring the narrow (compensatory) vision necessary to defeat the constant fore and aft eye oscillatory motions as the reading material is scanned.

SUMMARY

The primary objective of the invention is realized in a method and apparatus for restricting the field of vision so as to provide a dyslexic reader physical means for field-of-sight concentration in order to prevent eye wander or eye oscillatory motions along the direction of scan.

The method is essentially a two-step method that is performed by concurrently focusing the reader's field of vision by narrowing it with a real or virtual lens, and while obfuscating the reader's peripheral field of vision by obscuring or otherwise eliminating the peripheral field completely.

The apparatus is akin to ordinary eye glasses or spectacles and takes on such a form or the form of eye blinders, covering both eyes completely and peripherally, and having therein a minute aperture, known as the pin-hole camera. In either embodiment, that of the spectacles, in which the centralized and immediate field of vision remains clear according to the reader's clear vision needs, and the lens area peripheral to the central clear vision field is obscured, defocused (or simply opacified) or the pin-hole camera, wherein the eyes are completely covered with an opaque or obscuring shield and only the pin-hole aperture is used for sighting, the results are significantly the same. The oscillatory movements of the eye are greatly dampened with the result being that the dyslexic reader has physically accomplished for him or her the compensatory narrowing described by Levinson as heretofore unknown (in 1975 U.S. Pat. No. 3,906,644).

BRIEF DESCRIPTION OF THE DRAWINGS

Of the drawings:

FIG. 1 is an illustration of a sighting of reading material through a pin-hole aperture;

FIG. 2 is an isometric illustration of the preferred embodiment of this invention; and FIG. 3 is a side view of the FIG. 2 lens at 3—3.

DETAILED DESCRIPTION OF THE PREFERRED EMBODIMENT

Since reference will be had to certain terms throughout this detailed description, it is appropriate to identify and define certain terminology that will be hereinafter used.

Lens is a means used to refract (bend) light from its usual straight line of travel or propagation.

Shaping Lenses are optical or electro-optical devices capable of refracting light so as to focus or defocus images viewed therethrough.

Pin-hole camera is an optical device comprising a small aperture in an essentially opaque material that acts as a shaping lens by its ability to refract light passing therethrough.

Referring more particularly now to FIG. 1, there is shown a view through the pin-hole aperture of what is generally termed the pin-hole camera. The peripheral opaque material 10 obscures most of the (peripheral) reading matter 14 that is before the viewer or reader. By sighting through aperture 12, the reader views a smaller portion 16 of the reading matter and is aided in the natural compensatory narrowing of vision that was first recognized by Harold Levinson, M.D.. One of the instant inventors was able to personally receive this benefit by use of pin-hole camera device.

FIG. 2, the preferred embodiment to be provided the dyslexic reader has the form of an ordinary pair of spectacles 30 comprising lens frames 32, bridge and nose supports 34 and ear pieces 36. The nexus of the invention is realized in the combination of obfuscating lenses 20 with the essentially centralized clear view or reading lenses 22. Those of ordinary skill will readily recognize that the obfuscating lenses 20 may comprise either opacified or defocusing optical media, while the clear view or reading lenses 22 will comprise either clear vision or prescription windows through which the reader will sight.

Lastly, FIG. 3 is a sectional side elevation of one of the FIG. 2 lenses taken at 3—3. Here it can be seen that obfuscation lens 20 resides in frame 32 and clear view reading lens 22 may be either effected on the obverse or reverse of the lens 20 or simply comprise a separate lens insert or an aperture, whatever may be the requirements of the reader.

Inasmuch as a preferred embodiment of the invention has been illustrated in FIG. 2, and described in detail, it should be apparent to those of ordinary skill that many changes may be made in the disclosed embodiment without departing from the objectives of the inventors nor from the scope or spirit of the invention.

What is claimed:

1. A method for restricting peripheral field vision so as to provide a dyslexic reader physical means for central field-of-sight concentration in order to narrower confine the central vision of the reader so as to prevent eye wander, said method comprising the steps of:
  (a) providing focusing means comprising lens means to provide prescription focusing according to said reader's central reading vision needs and vision inhibiting means comprising means for inhibiting vision of the reader vertically and horizontally peripheral to said central reading vision;
  (b) and then the concurrently performed steps of focusing the reader's central direct field of vision by narrowing it with suitable focusing means placed proximate the reader's eyes while limiting the reader's broad peripheral field of vision with said suitable vision inhibiting means.

2. The method of claim 1 wherein said focusing and limiting steps are concurrently accomplished by using prescription lens spectacles.

3. The method of claim 1 wherein said focusing and limiting steps are concurrently accomplished by focusing close central vision, while virtually defocusing peripheral fields of vision of the reader.

* * * * *